(12) United States Patent
Kouda et al.

(10) Patent No.: US 12,269,930 B2
(45) Date of Patent: Apr. 8, 2025

(54) POLYURETHANE DISPERSION

(71) Applicant: MITSUI CHEMICALS, INC., Tokyo (JP)

(72) Inventors: Chikako Kouda, Sodegaura (JP); Kazuyuki Fukuda, Ichihara (JP); Takashi Uchida, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 652 days.

(21) Appl. No.: 17/616,886

(22) PCT Filed: Jun. 3, 2020

(86) PCT No.: PCT/JP2020/021922
§ 371 (c)(1),
(2) Date: Dec. 6, 2021

(87) PCT Pub. No.: WO2020/250768
PCT Pub. Date: Dec. 17, 2020

(65) Prior Publication Data
US 2022/0325059 A1    Oct. 13, 2022

(30) Foreign Application Priority Data

Jun. 13, 2019  (JP) .................. 2019-110363

(51) Int. Cl.
| | | |
|---|---|---|
| *C09D 175/06* | (2006.01) | |
| *C08G 18/08* | (2006.01) | |
| *C08G 18/12* | (2006.01) | |
| *C08G 18/32* | (2006.01) | |
| *C08G 18/34* | (2006.01) | |
| *C08G 18/44* | (2006.01) | |
| *C08G 18/48* | (2006.01) | |
| *C08G 18/65* | (2006.01) | |
| *C08G 18/66* | (2006.01) | |
| *C08G 18/72* | (2006.01) | |
| *C08G 18/73* | (2006.01) | |
| *C08G 18/75* | (2006.01) | |
| *C08G 18/76* | (2006.01) | |
| *C08J 7/04* | (2020.01) | |
| *C08J 7/048* | (2020.01) | |
| *C09D 175/08* | (2006.01) | |

(52) U.S. Cl.
CPC .......... *C08J 7/048* (2020.01); *C08G 18/0823* (2013.01); *C08G 18/12* (2013.01); *C08G 18/3206* (2013.01); *C08G 18/3231* (2013.01); *C08G 18/3271* (2013.01); *C08G 18/348* (2013.01); *C08G 18/44* (2013.01); *C08G 18/4825* (2013.01); *C08G 18/6511* (2013.01); *C08G 18/6517* (2013.01); *C08G 18/6659* (2013.01); *C08G 18/724* (2013.01); *C08G 18/73* (2013.01); *C08G 18/753* (2013.01); *C08G 18/757* (2013.01); *C08G 18/758* (2013.01); *C08G 18/7621* (2013.01); *C08G 18/7642* (2013.01); *C08J 7/0427* (2020.01); *C09D 175/06* (2013.01); *C09D 175/08* (2013.01); *C08J 2367/02* (2013.01); *C08J 2475/04* (2013.01)

(58) Field of Classification Search
CPC .... C08J 7/048; C08J 2367/02; C08J 2475/04; C08J 7/0427; C09D 175/06; C09D 175/08; C08G 18/0823; C08G 18/12; C08G 18/3206; C08G 18/3231; C08G 18/3271; C08G 18/348; C08G 18/44; C08G 18/4825; C08G 18/6511; C08G 18/6517; C08G 18/6659; C08G 18/724; C08G 18/73; C08G 18/753; C08G 18/757; C08G 18/758; C08G 18/7621; C08G 18/7642
USPC .......................................... 524/591
See application file for complete search history.

(56) References Cited

U.S. PATENT DOCUMENTS

| | | | | |
|---|---|---|---|---|
| 2003/0207122 | A1* | 11/2003 | Uchida | ........... C08J 5/18 428/423.1 |
| 2016/0159965 | A1* | 6/2016 | Uchida | ........... C08G 18/3893 524/839 |
| 2017/0166718 | A1* | 6/2017 | Ozeki | ........... C08L 75/04 |

FOREIGN PATENT DOCUMENTS

| | | | |
|---|---|---|---|
| JP | 2001-98047 A | | 4/2001 |
| JP | 2005139435 A | * | 6/2005 |
| JP | 2006143991 A | * | 6/2006 |
| JP | 2006193657 A | * | 7/2006 |
| JP | 2019-85511 A | | 6/2019 |
| JP | 2019085511 A | * | 6/2019 |
| WO | 2015/016069 A1 | | 2/2015 |
| WO | 2016/013624 A1 | | 1/2016 |

* cited by examiner

*Primary Examiner* — Kelechi C Egwim
(74) *Attorney, Agent, or Firm* — RANKIN, HILL & CLARK LLP

(57) ABSTRACT

In a polyurethane dispersion obtained by water-dispersing a polyurethane resin, the polyurethane resin is a reaction product obtained by reacting at least a polyisocyanate component with an active hydrogen group-containing component containing an active hydrogen compound having an anionic group, a ratio of the total moles of a urethane group and a urea group is 1.5 mol or more with respect to 1 kg of the polyurethane dispersion, and the carbonate ion concentration is 700 ppm or less with respect to the polyurethane dispersion.

6 Claims, 1 Drawing Sheet

1

1

POLYURETHANE DISPERSION

TECHNICAL FIELD

The present invention relates to a polyurethane dispersion, specifically, to a polyurethane dispersion for obtaining a polyurethane layer.

BACKGROUND ART

Conventionally, as a film having excellent gas barrier properties, for example, a composite film having gas barrier properties including a substrate film layer, and a polyurethane layer obtained by applying a polyurethane dispersion having the gas barrier properties onto the substrate film layer to be dried has been known.

As the polyurethane dispersion having the gas barrier properties, for example, an aqueous dispersion of a polyurethane resin having the gas barrier properties with the solid content concentration of 25% by mass which is obtained by reacting a hydrogenated xylylene diisocyanate, a dimethylol propionic acid, and an ethylene glycol; then, neutralizing a carboxylic acid group-containing polyurethane prepolymer solution to be obtained with a neutralizing agent such as a triethylamine; and dispersing the solution in water to be subjected to a chain extension reaction with a 2-[(2-aminoethyl)amino]ethanol has been proposed (ref: for example, Patent Document 1 (Production Example 9)).

CITATION LIST

Patent Document

Patent Document 1: Japanese Unexamined Patent Publication No. 2001-98047

SUMMARY OF THE INVENTION

Problem to be Solved by the Invention

In the aqueous dispersion (polyurethane dispersion) of the polyurethane resin described above, relatively high solid content concentration of the polyurethane resin (for example, above 20% by mass) is required from the viewpoint of production efficiency of a coating film and a reduction in transportation cost.

However, when the solid content concentration of the polyurethane resin is relatively high (for example, above 20% by mass), the concentration of a urethane group and a urea group in the polyurethane dispersion is also relatively high.

On the other hand, in the production of the polyurethane dispersion, since in a chain extension reaction, an isocyanate group-terminated polyurethane prepolymer having a carboxylic acid group is dispersed in water, a carbon dioxide gas is generated by a reaction of water with an isocyanate group, and carbonate ions are contained in the polyurethane dispersion.

Then, in the polyurethane dispersion, the carbonate ion may eliminate a neutralizing agent which neutralizes a carboxylic acid group (anionic group) to generate a free carboxylic acid group (anionic group).

When the free carboxylic acid group (anionic group) is generated, the water dispersion stability of the polyurethane dispersion is lowered. Above all, a polyurethane dispersion having high concentration of the urethane group and the urea group has a high cohesive force of a polyurethane resin, and therefore, when the water dispersion stability is lowered, aggregation of the polyurethane resin tends to occur.

As a result, the stability of the particles dispersed in water is lowered, and the storage stability (thermal stability) during storage and transportation of the polyurethane dispersion, and the mechanical stability (coagulation resistance) at the time of machine application may not be sufficient.

The present invention provides a polyurethane dispersion capable of suppressing aggregation of a polyurethane resin even when the concentration of a urethane group and a urea group is relatively high, and having excellent storage stability and mechanical stability.

Means for Solving the Problem

The present invention [1] includes a polyurethane dispersion obtained by water-dispersing a polyurethane resin, wherein the polyurethane resin is a reaction product obtained by reacting at least a polyisocyanate component with an active hydrogen group-containing component containing an active hydrogen compound having an anionic group, a ratio of the total moles of a urethane group and a urea group is 1.5 mol or more with respect to 1 kg of the polyurethane dispersion, and the carbonate ion concentration is 700 ppm or less with respect to the polyurethane dispersion.

The present invention [2] includes the polyurethane dispersion described in the above-described [1], wherein the polyurethane resin is a polyurethane resin having gas barrier properties.

The present invention [3] includes the polyurethane dispersion described in the above-described [1], wherein the polyisocyanate component contains a polyisocyanate having an aromatic ring.

The present invention [4] includes the polyurethane dispersion described in any one of the above-described [1] to [3], wherein the polyisocyanate component contains an araliphatic polyisocyanate and an alicyclic polyisocyanate.

The present invention [5] includes the polyurethane dispersion described in any one of the above-described [1] to [4], wherein the polyurethane resin is a reaction product of an isocyanate group-terminated prepolymer and a chain extender, the isocyanate group-terminated prepolymer being obtained by reacting at least a polyisocyanate component containing a xylylene diisocyanate with an active hydrogen group-containing component containing a short chain diol having 2 to 6 carbon atoms and an active hydrogen compound having an anionic group.

The present invention [6] includes the polyurethane dispersion described in any one of the above-described [1] to [5], wherein a change rate (D2/D1) of an average particle size D2 of a polyurethane dispersion after storage at 40° C. for 7 days with respect to an average particle size D1 of a polyurethane dispersion before storage is 2.5 or less.

Effect of the Invention

In the polyurethane dispersion of the present invention, the active hydrogen compound having an anionic group is used as a raw material component of the polyurethane resin, and a ratio of the total moles of the urethane group and the urea group is 1.5 mol or more with respect to 1 kg of the polyurethane dispersion, and the carbonate ion concentration is 700 ppm or less with respect to the polyurethane dispersion.

In other words, in the above-described polyurethane dispersion, the concentration of the urethane group and the urea group is relatively high. In such a case, when elimination of the neutralizing agent with respect to the anionic group occurs and a free anionic group is generated, the stability of the particles tends to be lowered, and aggregation of the polyurethane resin tends to occur.

However, in the above-described polyurethane dispersion, since the carbonate ion concentration is sufficiently low, it is possible to suppress the elimination of the neutralizing agent by the carbonate ion, and as a result, it is possible to suppress the generation of the free anionic group and the aggregation of the polyurethane resin.

Therefore, the above-described polyurethane dispersion has excellent storage stability and mechanical stability.

DESCRIPTION OF EMBODIMENTS

Figure 1:
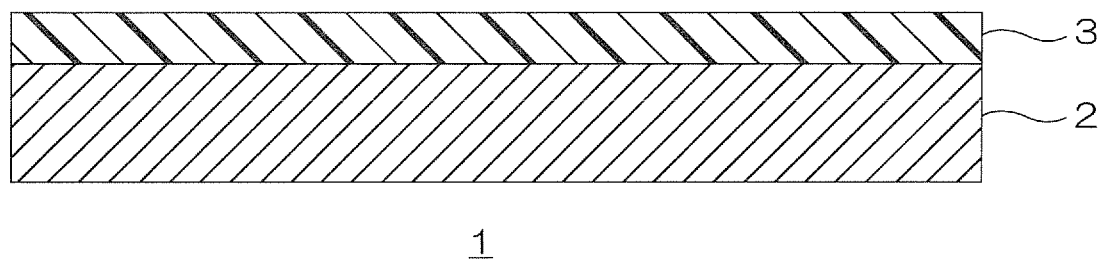
FIG. 1 shows a schematic configuration view for illustrating one embodiment of a polyurethane laminate obtained by using a polyurethane dispersion of the present invention.

A polyurethane dispersion of the present invention is obtained by water-dispersing a polyurethane resin (aqueous polyurethane resin).

As the details are described later, the polyurethane resin of the present invention is a polyurethane resin having a relatively high content ratio of a urethane group and a urea group. Examples of the polyurethane resin include polyurethane resins having gas barrier properties and chemical resistant polyurethane resins, and preferably, a polyurethane resin having gas barrier properties is used.

The gas barrier properties in the present invention indicate properties of lowering the transmittance of oxygen. More specifically, it is defined that the polyurethane resin has the gas barrier properties when the oxygen permeability at 40° C. after 7 days of a laminate including a layer of a polyurethane resin measured in conformity with Examples to be described later is 90 cc/(m$^2$·day·atm) or less.

Such a polyurethane resin is, for example, obtained by a reaction of an isocyanate group-terminated prepolymer with a chain extender. In other words, the polyurethane resin is a secondary reaction product of the isocyanate group-terminated prepolymer and the chain extender.

The isocyanate group-terminated prepolymer is obtained by a reaction of a polyisocyanate component with an active hydrogen group-containing component. In other words, the isocyanate group-terminated prepolymer is a primary reaction product of the polyisocyanate component and the active hydrogen group-containing component.

Examples of the polyisocyanate component include polyisocyanates having an aromatic ring and polyisocyanates having no aromatic ring.

Examples of the polyisocyanate having an aromatic ring include araliphatic polyisocyanates and aromatic polyisocyanates.

Examples of the araliphatic polyisocyanate include araliphatic diisocyanate monomers (araliphatic diisocyanates and the like) such as xylylene diisocyanate (1,2-, 1,3- or 1,4-xylylene diisocyanate) (XDI), tetramethylxylylene diisocyanate (1,3- or 1,4-tetramethylxylylene diisocyanate or a mixture thereof) (TMXDI), and ω, ω'-diisocyanate-1,4-diethylbenzene, and preferably, a xylylene diisocyanate (XDI) is used. These araliphatic diisocyanate monomers may be used alone or in combination of two or more.

Further, an example of the araliphatic polyisocyanate includes a derivative of the araliphatic diisocyanate monomer.

Examples of the derivative of the araliphatic diisocyanate monomer include multimers (for example, dimers, trimers, pentamers, heptamers, and the like) of the araliphatic diisocyanate monomer (for example, isocyanurate modified products, iminooxadiazinedione modified products, and the like), allophanate modified products (for example, allophanate modified products generated by a reaction of an araliphatic diisocyanate monomer with a known monohydric alcohol and/or a known dihydric alcohol and the like), polyol modified products (for example, polyol modified products (alcohol adducts) generated by a reaction of an araliphatic diisocyanate monomer with a known trihydric or more alcohol and the like), biuret modified products (for example, biuret-modified products generated by a reaction of an araliphatic diisocyanate monomer with water or amines and the like), urea-modified products (for example, urea-modified products generated by a reaction of an araliphatic diisocyanate monomer with a diamine and the like), oxadiazine trione modified products (for example, oxadiazine trione generated by a reaction of an araliphatic diisocyanate monomer with a carbon dioxide gas and the like), carbodiimide modified products (carbodiimide modified products generated by a decarboxylation condensation reaction of the araliphatic diisocyanate monomer and the like), urethodione modified products, and uretonimine modified products. These derivatives may be used alone or in combination of two or more.

Examples of the aromatic polyisocyanate include aromatic diisocyanate monomers (aromatic diisocyanates and the like) such as tolylene diisocyanate (2,4- or 2,6-tolylene diisocyanate or a mixture thereof) (TDI), phenylene diisocyanate (m-, p-phenylene diisocyanate or a mixture thereof), 4,4'-diphenyl diisocyanate, 1,5-naphthalene diisocyanate (NDI), diphenylmethane diisocyanate (4,4'-, 2,4'-, or 2,2'-diphenylmethane diisocyanate or a mixture thereof) (MDI), 4,4'-toluidine diisocyanate (TODI), and 4,4'-diphenylether diisocyanate, and preferably, a tolylene diisocyanate (TDI) is used. These aromatic diisocyanate monomers may be used alone or in combination of two or more.

Further, an example of the aromatic polyisocyanate includes a derivative of the aromatic diisocyanate monomer. Examples of the derivative include the above-described derivatives (derivatives illustrated as the derivatives of the araliphatic diisocyanate monomers). These derivatives may be used alone or in combination of two or more.

These polyisocyanates having an aromatic ring may be used alone or in combination of two or more.

Examples of the polyisocyanate having no aromatic ring include aliphatic polyisocyanates and alicyclic polyisocyanates.

Examples of the aliphatic polyisocyanate include aliphatic diisocyanate monomers (chain aliphatic diisocyanates and the like) such as trimethylene diisocyanate, 1,2-propylene diisocyanate, butylene diisocyanate (tetramethylene diisocyanate, 1,2-butylene diisocyanate, 2,3-butylene diisocyanate, 1,3-butylene diisocyanate), 1,5-pentamethylene diisocyanate (PDI), 1,6-hexamethylene diisocyanate (HDI), 2,4,4- or 2,2,4-trimethylhexamethylene diisocyanate, and 2,6-diisocyanate methylcaproate, and preferably, a 1,5-pentamethylene diisocyanate (PDI) and a 1,6-hexamethylene diisocyanate are used. These aliphatic diisocyanate monomers may be used alone or in combination of two or more.

Further, an example of the aliphatic polyisocyanate includes a derivative of the aliphatic diisocyanate monomer. Examples of the derivative include the above-described derivatives (derivatives illustrated as the derivatives of the araliphatic diisocyanate monomers). These derivatives may be used alone or in combination of two or more.

Examples of the alicyclic polyisocyanate include alicyclic diisocyanate monomers (alicyclic diisocyanates and the like) such as 1,3-cyclopentane diisocyanate, 1,3-cyclopentene diisocyanate, cyclohexane diisocyanate (1,4-cyclohexane diisocyanate, 1,3-cyclohexane diisocyanate), 3-isocyanatomethyl-3,5,5-trimethylcyclohexyl isocyanate (also known as isophorone diisocyanate) (IPDI), bis(isocyanatomethyl)cyclohexane (also known as hydrogenated xylylene diisocyanate (1,2-, 1,3-, or 1,4-bis(isocyanatomethyl)cyclohexane)) ($H_6XDI$), methylenebis(cyclohexyl isocyanate) (also known as hydrogenated diphenylmethane diisocyanate (4,4'-, 2,4'-, or 2,2'-methylenebis(cyclohexyl isocyanate), trans-trans isomer, trans-cis isomer, and cis-cis isomer, or a mixture thereof) ($H_{12}MDI$), methylcyclohexane diisocyanate (methyl-2,4-cyclohexane diisocyanate, methyl-2,6-cyclohexane diisocyante), and norbornane diisocyanate (various isomers or a mixture thereof) (NBDI), and preferably, a bis(isocyanatomethyl)cyclohexane ($H_6XDI$) and a methylenebis(cyclohexyl isocyanate) ($H_{12}MDI$) are used, more preferably, a methylenebis(cyclohexyl isocyanate) ($H_{12}MDI$) is used. These alicyclic diisocyanate monomers may be used alone or in combination of two or more.

Further, an example of the alicyclic polyisocyanate includes a derivative of the alicyclic diisocyanate monomer. Examples of the derivative include the above-described derivatives (derivatives illustrated as the derivatives of the araliphatic diisocyanate monomers). These derivatives may be used alone or in combination of two or more.

These polyisocyanates having no aromatic ring may be used alone or in combination of two or more.

The polyisocyanate component is not particularly limited, and for example, a polyisocyanate having an aromatic ring described above may be used alone, a polyisocyanate having no aromatic ring described above may be used alone, and furthermore, these may be used in combination.

From the viewpoint of improving the gas barrier properties, the polyisocyanate component preferably contains a polyisocyanate having an aromatic ring, more preferably contains an araliphatic polyisocyanate, further more preferably contains an araliphatic diisocyanate monomer, particularly preferably contains a xylylene diisocyanate (XDI).

When the polyisocyanate component contains a polyisocyanate having an aromatic ring (preferably an araliphatic polyisocyanate, more preferably a xylylene diisocyanate (XDI)), a content ratio thereof is, for example, 30 parts by mass or more, preferably 50 parts by mass or more, more preferably 70 parts by mass or more, and for example, 100 parts by mass or less, preferably 95 parts by mass or less, more preferably 90 parts by mass or less with respect to 100 parts by mass of the total amount of the polyisocyanate component.

In addition, from the viewpoint of improving the water dispersion stability, the polyisocyanate component preferably contains a polyisocyanate having an aromatic ring and a polyisocyanate having no aromatic ring, more preferably contains an araliphatic polyisocyanate and an alicyclic polyisocyanate, further more preferably contains an araliphatic diisocyanate monomer and an alicyclic diisocyanate monomer, particularly preferably contains a xylylene diisocyanate (XDI) and a methylenebis(cyclohexyl isocyanate) ($H_{12}MDI$).

In addition, when the polyisocyanate component contains the araliphatic polyisocyanate and the alicyclic polyisocyanate, a content ratio of the araliphatic polyisocyanate is, for example, 30 parts by mass or more, preferably 50 parts by mass or more, more preferably 70 parts by mass or more, and for example, 99 parts by mass or less, preferably 95 parts by mass or less, more preferably 90 parts by mass or less with respect to 100 parts by mass of the total amount of these. Further, a content ratio of the alicyclic polyisocyanate is, for example, 1 part by mass or more, preferably 5 parts by mass or more, more preferably 10 parts by mass or more, and for example, 70 parts by mass or less, preferably 50 parts by mass or less, more preferably 30 parts by mass or less.

Examples of the active hydrogen group-containing component include polyol components. The polyol component contains, as an essential component, an active hydrogen group-containing compound having an anionic group.

The active hydrogen group-containing compound having an anionic group is, for example, an organic compound having an anionic group such as a carboxylic acid and an active hydrogen group such as two or more hydroxyl groups or amino groups in combination.

More specifically, examples of the active hydrogen group-containing compound having an anionic group include an organic compound having a carboxylic acid and two hydroxyl groups in combination (active hydrogen group-containing compound having a carboxy group (for example, a carboxy group-containing polyol and the like)).

Examples of the carboxy group-containing polyol include polyhydroxy alkanoic acids such as 2,2-dimethylolacetic acid, 2,2-dimethylollactic acid, 2,2-dimethylolpropionic acid (also known as dimethylolpropionic acid), 2,2-dimethylolbutanoic acid, 2,2-dimethylolbutyric acid, and 2,2-dimethylolvaleric acid, and preferably, a 2,2-dimethylolpropionic acid is used.

These active hydrogen group-containing compounds having an anionic group may be used alone or in combination of two or more.

As the active hydrogen group-containing compound having an anionic group, preferably, a carboxy group-containing polyol is used, more preferably, a polyhydroxyalkanoic acid is used, further more preferably, a dimethylolpropionic acid is used.

A mixing ratio of the active hydrogen group-containing compound having an anionic group is, for example, 10 parts by mass or more, preferably 20 parts by mass or more, more preferably 30 parts by mass or more, and for example, 70 parts by mass or less, preferably 55 parts by mass or less, more preferably 40 parts by mass or less with respect to 100 parts by mass of the total amount of the polyol component.

Also, the polyol component preferably contains, as an optional component, a short chain diol having 2 to 6 carbon atoms.

A short chain diol having 2 to 6 carbon atoms is an organic compound having 50 or more and 650 or less of a molecular weight (in the case of having a molecular weight distribution, a number average molecular weight in terms of polystyrene by GPC measurement) and having 2 to 6 carbon atoms having two hydroxyl groups, and specifically, examples thereof include alkanediols having 2 to 6 carbon atoms (alkylene glycols having 2 to 6 carbon atoms) such as ethylene glycol, propylene glycol, 1,3-propane diol, 1,4-butylene glycol, 1,3-butylene glycol, 1,2-butylene glycol, 1,5-pentanediol, 1,6-hexanediol, neopentyl glycol, 3-methyl-1,5-pentanediol, and 1,3- or 1,4-cyclohexanediol; ether diols having 2 to 6 carbon atoms such as diethylene glycol, triethylene glycol, and dipropylene glycol; and alkenediols having 2 to 6 carbon atoms such as 1,4-dihydroxy-2-butene.

These short chain diols having 2 to 6 carbon atoms may be used alone or in combination of two or more.

As the short chain diol having 2 to 6 carbon atoms, from the viewpoint of gas barrier properties, preferably, an alkanediol having 2 to 6 carbon atoms is used, more preferably, an ethylene glycol is used.

A mixing ratio of the short chain diol having 2 to 6 carbon atoms is, for example, 10 parts by mass or more, preferably 30 parts by mass or more, more preferably 50 parts by mass or more, and for example, 90 parts by mass or less, preferably 80 parts by mass or less, more preferably 70 parts by mass or less with respect to 100 parts by mass of the total amount of the polyol component.

The polyol component may further contain, as an optional component, another low molecular weight polyol (a low molecular weight polyol excluding the diol having 2 to 6 carbon atoms and the active hydrogen group-containing compound having a hydrophilic group) and a high molecular weight polyol.

The polyol component preferably does not contain the high molecular weight polyol from the viewpoint of gas barrier properties.

The high molecular weight polyol is a compound having a molecular weight (number average molecular weight) of above 650 and having two or more hydroxyl groups, and examples thereof include high molecular weight macropolyols having a molecular weight of above 650 such as a polyether polyol (for example, a polyoxyalkylene (2 to 3 carbon atoms) polyol, a polytetramethylene ether polyol, and the like), a polyester polyol (for example, an adipic acid-based polyester polyol, a phthalic acid-based polyester polyol, a lactone-based polyester polyol, and the like), a polycarbonate polyol, a polyurethane polyol (for example, a polyol obtained by urethane-modifying a polyether polyol, a polyester polyol, a polycarbonate polyol, and the like by a polyisocyanate), an epoxy polyol, a vegetable oil polyol, a polyolefin polyol, an acrylic polyol, and a vinyl monomer-modified polyol.

The high molecular weight polyol may cause a reduction in the gas barrier properties.

Therefore, the polyol component does not contain the high molecular weight polyol. Thus, it is possible to improve the gas barrier properties of the polyurethane resin (described later).

On the other hand, the polyol component may contain, as an optional component, a low molecular weight polyol having a molecular weight of 50 or more and 650 or less (excluding the above-described short chain diol having 2 to 6 carbon atoms) (hereinafter, referred to as another low molecular weight polyol).

Examples of the other low molecular weight polyol include a diol having 7 or more carbon atoms and a trihydric or more low molecular weight polyol.

Examples of the diol having 7 or more carbon atoms include dihydric alcohols (diols) having 7 or more carbon atoms such as alkane-1,2-diol having 7 to 20 carbon atoms, 2,6-dimethyl-1-octene-3,8-diol, 1,3- or 1,4-cyclohexanedimethanol and a mixture thereof, hydrogenated bisphenol A, and bisphenol A.

These diols having 7 or more carbon atoms may be used alone or in combination of two or more.

The trihydric or more low molecular weight polyol is an organic compound having a molecular weight of 650 or less and having three or more hydroxyl groups in one molecule, and examples thereof include trihydric alcohols (low molecular weight triols) such as glycerine, 2-methyl-2-hydroxymethyl-1,3-propanediol, 2,4-dihydroxy-3-hydroxymethylpentane, 1,2,6-hexanetriol, trimethylolpropane, and 2,2-bis(hydroxymethyl)-3-butanol; tetrahydric alcohols such as tetramethylolmethane (pentaerythritol) and diglycerine; pentahydric alcohols such as xylitol; hexahydric alcohols such as sorbitol, mannitol, allitol, iditol, dulcitol, altritol, inositol, and dipentaerythritol; heptahydric alcohols such as perseitol; and octahydric alcohols such as sucrose.

These trihydric or more low molecular weight polyols may be used alone or in combination of two or more.

Further, when the number average molecular weight is 650 or less, the above-described macropolyols (specifically, for example, the low molecular weight macropolyols having a molecular weight of 650 or less such as a polyether polyol (for example, a polyoxyalkylene polyol, a polytetramethylene ether polyol, and the like), a polyester polyol (for example, an adipic acid-based polyester polyol, a phthalic acid-based polyester polyol, a lactone-based polyester polyol, and the like), a polycarbonate polyol, a polyurethane polyol (for example, a polyol obtained by urethane-modifying the polyether polyol, the polyester polyol, the polycarbonate polyol, and the like by the polyisocyanate), an epoxy polyol, a vegetable oil polyol, a polyolefin polyol, an acrylic polyol, and a vinyl monomer-modified polyol) can be used as the other low molecular weight polyol.

These other low molecular weight polyols may be used alone or in combination of two or more.

As the other low molecular weight polyol, from the viewpoint of solvent resistance, heat resistance, and water dispersion stability of the polyurethane dispersion, preferably, a trihydric or more low molecular weight polyol is used, more preferably, a trihydric alcohol and a tetrahydric alcohol are used, further more preferably, a trihydric alcohol is used, particularly preferably, a trimethylolpropane is used.

When the other low molecular weight polyol is blended, a mixing ratio thereof is, for example, 0.2 parts by mass or more, preferably 1 part by mass or more, more preferably 2 parts by mass or more, and for example, 20 parts by mass or less, preferably 10 parts by mass or less, more preferably 8 parts by mass or less with respect to 100 parts by mass of the total amount of the polyol component.

Further, as a combination ratio of the short chain diol having 2 to 6 carbon atoms and the other low molecular weight polyol (preferably, the trihydric or more low molecular weight polyol), a ratio of the other low molecular weight polyol is, for example, 2 parts by mass or more, preferably 5 parts by mass or more, and for example, 20 parts by mass or less, preferably 15 parts by mass or less, more preferably 10 parts by mass or less with respect to 100 parts by mass of the total amount of these.

Further, a ratio of the active hydrogen group-containing compound having an anionic group is, for example, 10 parts by mass or more, preferably 20 parts by mass or more, more preferably 40 parts by mass or more, and for example, 90 parts by mass or less, preferably 80 parts by mass or less, more preferably 70 parts by mass or less with respect to 100 parts by mass of the total amount of the short chain diol having 2 to 6 carbon atoms and the other low molecular weight polyol (preferably, the trihydric or more low molecular weight polyol).

When the content ratio of the other low molecular weight polyol is within the above-described range, it is possible to ensure excellent dispersibility. Therefore, it is possible to excellently form a polyurethane layer having excellent gas barrier properties and adhesive properties.

The polyol component preferably consists of a short chain diol having 2 to 6 carbon atoms, a trihydric or more low molecular weight polyol, and an active hydrogen group-containing compound having an anionic group, or consists of a short chain diol having 2 to 6 carbon atoms, and an active hydrogen group-containing compound having an anionic group.

Then, in order to synthesize the isocyanate group-terminated prepolymer, each of the above-described components is blended at a ratio of above 1, preferably a ratio of 1.1 to 10 in an equivalent ratio (isocyanate group/active hydrogen group) of an isocyanate group to an active hydrogen group (hydroxyl group). Then, each of the above-described components is reacted by a known polymerization method such as bulk polymerization or solution polymerization, preferably by solution polymerization in which the reactivity and the viscosity are more easily adjusted.

In the bulk polymerization, for example, the above-described components are blended under a nitrogen atmosphere to be reacted at a reaction temperature of 75 to 85° C. for about 1 to 20 hours.

In the solution polymerization, for example, the above-described components are blended into an organic solvent (solvent) under a nitrogen atmosphere to be reacted at a reaction temperature of 20 to 80° C. for about 1 to 20 hours.

Examples of the organic solvent include acetone, methyl ethyl ketone, ethyl acetate, tetrahydrofuran, and acetonitrile which are inert to an isocyanate group and rich in hydrophilicity.

In the polymerization reaction, the reaction is carried out until the isocyanate group content in the reaction solution becomes the following isocyanate group concentration.

In addition, in the above-described polymerization, for example, a reaction catalyst such as amine-type, tin-type, and lead-type may be added if necessary, and an unreacted polyisocyanate may be also, for example, removed from the obtained isocyanate group-terminated prepolymer by a known method such as distillation and extraction.

The isocyanate group-terminated prepolymer thus obtained is a polyurethane prepolymer having two or more free isocyanate groups at its molecular terminal, and has relatively high isocyanate group concentration (isocyanate group content in terms of solid content excluding a solvent). More specifically, the isocyanate group concentration is, for example, 4% by mass or more, preferably 5% by mass or more, more preferably 6% by mass or more, further more preferably 8% by mass or more, and for example, 25% by mass or less, preferably 20% by mass or less, more preferably 17% by mass or less, further more preferably 15% by mass or less.

Further, an average functionality of the isocyanate group is, for example, 1.5 or more, preferably 1.9 or more, more preferably 2.0 or more, and for example, 3.0 or less, preferably 2.5 or less.

When the average functionality of the isocyanate group is within the above-described range, it is possible to obtain the above-described stable polyurethane dispersion, and to ensure substrate adhesive properties, gas barrier properties, and the like.

Further, a number average molecular weight (molecular weight in terms of polystyrene by GPC measurement) thereof is, for example, 500 or more, preferably 800 or more, and for example, 100000 or less, preferably 50000 or less.

Next, in this method, a neutralizing agent is added to the isocyanate group-terminated prepolymer obtained by the description above to neutralize the anionic group by the neutralizing agent, thereby forming a salt.

An example of the neutralizing agent includes a conventional base, and examples thereof include an organic base and an inorganic base.

Examples of the organic base include tertiary amines such as trialkylamines (for example, trialkylamines having 1 to 4 carbon atoms such as trimethylamine and triethylamine) and alkanolamines (for example, dimethylethanolamine, methyldiethanolamine, triethanolamine, triisopropanolamine, and the like), and secondary amines such as heterocyclic amines (morpholine and the like).

Examples of the inorganic base include ammonia, alkali metal hydroxides (for example, lithium hydroxide, sodium hydroxide, potassium hydroxide, and the like), alkaline earth metal hydroxides (for example, magnesium hydroxide, calcium hydroxide, and the like), and alkali metal carbonates (for example, sodium carbonate, potassium carbonate, and the like).

These neutralizing agents may be used alone or in combination of two or more.

As the neutralizing agent, preferably, an organic base is used, more preferably, a tertiary amine is used, further more preferably, a trialkylamine is used, particularly preferably, a triethylamine is used. That is, the neutralizing agent preferably consists of an organic base, more preferably consists of a tertiary amine, further more preferably consists of a trialkylamine, particularly preferably consists of a triethylamine.

An addition amount of the neutralizing agent is, for example, 0.4 equivalents or more, preferably 0.6 equivalents or more, and for example, 1.2 equivalents or less, preferably 1 equivalent or less with respect to 1 equivalent of the anionic group.

Then, in this method, an isocyanate group-terminated prepolymer neutralized by the above-described neutralizing agent and a chain extender are reacted in water to obtain a polyurethane dispersion obtained by water-dispersing a polyurethane resin.

The chain extender is an organic compound having a plurality of active hydrogen groups for chain extension reaction of an isocyanate group-terminated prepolymer, and examples thereof include polyamine compounds such as an aromatic polyamine, an araliphatic polyamine, an alicyclic polyamine, an aliphatic polyamine, and a polyoxyethylene group-containing polyamine, and amino alcohols.

Examples of the aromatic polyamine include 4,4'-diphenylmethanediamine and tolylenediamine.

Examples of the araliphatic polyamine include 1,3- or 1,4-xylylenediamine and a mixture thereof.

Examples of the alicyclic polyamine include 3-aminomethyl-3,5,5-trimethylcyclohexylamine (also known as isophoronediamine), 4,4'-dicyclohexylmethanediamine, 2,5(2,6)-bis(aminomethyl)bicyclo[2.2.1]heptane, 1,4-cyclohexanediamine, 1-amino-3-aminomethyl-3,5,5-trimethylcyclohexane, bis-(4-aminocyclohexyl)methane, diaminocyclohexane, 3,9-bis(3-aminopropyl)-2,4,8,10-tetraoxaspiro[5,5]undecane, and 1,3- and 1,4-bis(aminomethyl)cyclohexane, and a mixture of these.

Examples of the aliphatic polyamine include ethylenediamine, propylenediamine, 1,3-propanediamine, 1,4-butanediamine, 1,5-pentanediamine, 1,6-hexamethylenediamine, hydrazine (including hydrate), diethylenetriamine, triethylenetetramine, tetraethylenepentamine, 1,2-diaminoethane, 1,2-diaminopropane, and 1,3-diaminopentane.

Examples of the polyoxyethylene group-containing polyamine include polyoxyalkylene ether diamines such as polyoxyethylene ether diamine. More specifically, examples thereof include PEG #1000 diamine manufactured by NOF CORPORATION and JEFFAMINE ED-2003, EDR-148, and XTJ-512 manufactured by Huntsman Corporation.

Examples of the amino alcohol include 2-((2-aminoethyl) amino)ethanol (also known as N-(2-aminoethyl)ethanolamine) and 2-((2-aminoethyl)amino)-1-methylpropanol (also known as N-(2-aminoethyl)isopropanolamine).

Further, an example of the chain extender includes an alkoxysilyl compound having a primary amino group, or a primary amino group and a secondary amino group.

Examples of the alkoxysilyl compound having a primary amino group, or a primary amino group and a secondary amino group include alkoxysilyl compounds having a primary amino group such as γ-aminopropyltrimethoxysilane, γ-aminopropyltriethoxysilane, and N-phenyl-γ-aminopropyltrimethoxysilane, and alkoxysilyl compounds having a primary amino group and a secondary amino group such as N-β(aminoethyl)γ-aminopropyltrimethoxysilane (also known as N-2-(aminoethyl)-3-aminopropyltrimethoxysilane, N-β(aminoethyl)γ-aminopropyltriethoxysilane (also known as N-2-(aminoethyl)-3-aminopropyltriethoxysilane), N-β(aminoethyl)γ-aminopropylmethyldimethoxysilane (also known as N-2-(aminoethyl)-3-aminopropylmethyldimethoxysilane), and N-β(aminoethyl)γ-aminopropylmethyldiethoxysilane (also known as N-2-(aminoethyl)-3-aminopropylmethyldiethoxysilane).

These chain extenders may be used alone or in combination of two or more.

As the chain extender, preferably, an amino alcohol is used, more preferably, a 2-((2-aminoethyl)amino)ethanol is used.

Then, in order to react the isocyanate group-terminated prepolymer with the chain extender in water, for example, first, the isocyanate group-terminated prepolymer is water-dispersed by adding the isocyanate group-terminated prepolymer to water, and then, the chain extender is added thereto to chain-extend the isocyanate group-terminated prepolymer by the chain extender.

In order to water-disperse the isocyanate group-terminated prepolymer, while water is stirred, the isocyanate group-terminated prepolymer is added at a ratio of 100 to 1000 parts by mass of water with respect to 100 parts by mass of the isocyanate group-terminated prepolymer. Further, water may be also added to the isocyanate group-terminated prepolymer at the above-described ratio.

Thereafter, the chain extender is added dropwise to water in which the isocyanate group-terminated prepolymer is water-dispersed under stirring so that an equivalent ratio (active hydrogen group/isocyanate group) of the active hydrogen group (the amino group and the hydroxyl group) of the chain extender to the isocyanate group of the isocyanate group-terminated prepolymer is, for example, 0.6 to 1.2.

The reaction is completed, for example, at normal temperature, while the chain extender dropped and stirred. The reaction time until the completion of the reaction is, for example, 0.1 hours or more, and for example, 10 hours or less.

Thus, a polyurethane resin is obtained, and a dispersion (polyurethane dispersion) obtained by water-dispersing the polyurethane resin is obtained.

As a content ratio of the urethane group and the urea group with respect to the polyurethane resin (solid content), the total moles of the urethane group and the urea group is, for example, 5.0 mol or more, preferably 5.5 mol or more, more preferably 6.0 mol or more, further more preferably 6.5 mol or more, and for example, 9.0 mol or less, preferably 8.5 mol or less, more preferably 8.0 mol or less, further more preferably 7.5 mol or less with respect to 1 kg of the polyurethane resin (solid content).

The content ratio of the urethane group and the urea group can be calculated from a charging ratio of raw material components (hereinafter, the same).

When the content ratio of the urethane group and the urea group with respect to the polyurethane resin (solid content) is within the above-described range, it is possible to obtain a polyurethane layer having excellent gas barrier properties.

Further, an acid value of the polyurethane resin (solid content) is, for example, 10 mgKOH/g or more, preferably 20 mgKOH/g or more, and for example, 50 mgKOH/g or less, preferably 40 mgKOH/g or less.

The acid value can be measured by a conventional method, and can be also determined by calculation from the carboxylic acid content in the polyurethane resin. The carboxylic acid content can be calculated from the raw material of the polyurethane resin and the charging amount thereof.

Then, in this method, if necessary, an organic solvent or water is removed (desolvated).

Thus, the solid content concentration of the polyurethane resin of the polyurethane dispersion is adjusted, and the ratio of the urethane group and the urea group in the polyurethane dispersion with respect to the polyurethane dispersion is adjusted within a predetermined range.

From the viewpoint of production efficiency of a coating film and reduction of the transportation cost, the solid content concentration of the polyurethane resin in the polyurethane dispersion is relatively high, and is, for example, above 20% by mass, preferably 21% by mass or more, more preferably 25% by mass or more, further more preferably 30% by mass or more, and for example, 60% by mass or less, preferably 50% by mass or less.

When the solid content concentration of the polyurethane resin in the polyurethane dispersion is within the above-described range, the production efficiency of the coating film and the transportation cost are excellent.

In other words, since the polyurethane dispersion usually forms the coating film by evaporating water, when the solid content concentration is above the above-described lower limit, it is possible to reduce the energy cost in the evaporation of water, also, to reduce the environmental load, and to improve the production efficiency of the coating film. Further, when the solid content concentration is above the above-described lower limit, the polyurethane resin (solid content) can be efficiently carried with a small mass and volume as compared with a case where the solid content concentration is below the above-described lower limit, so that the transportation cost is excellent.

In addition, as a content ratio of the urethane group and the urea group with respect to the polyurethane dispersion, the total moles of the urethane group and the urea group is 1.5 mol or more, preferably 1.7 mol or more, more preferably 1.8 mol or more, further more preferably 1.9 mol or more, and for example, 5.0 mol or less, preferably 4.0 mol or less, more preferably 3.0 mol or less, further more preferably 2.5 mol or less with respect to 1 kg of the polyurethane dispersion.

When the content ratio of the urethane group and the urea group with respect to the polyurethane dispersion is within the above-described range, it is possible to obtain a polyurethane layer having excellent gas barrier properties.

On the other hand, in the above-described polyurethane dispersion, since the concentration of the urethane group and the urea group is relatively high, when elimination of the neutralizing agent with respect to the anionic group occurs, and a free anionic group is generated, the stability of the particles tends to be lowered, and aggregation of the polyurethane resin tends to occur.

In particular, when a xylylene diisocyanate is used as a polyisocyanate component, a carbon dioxide gas tends to be generated, resulting in the high carbonate ion concentration. Therefore, the aggregation of the polyurethane resin tends to occur.

Therefore, the polyurethane dispersion having the high concentration of the urethane group and the urea group may not have sufficient storage stability (thermal stability) at the time of storage and transportation, and mechanical stability (coagulation resistance) at the time of machine application.

On the other hand, for example, in order to suppress the aggregation, it is also considered that the solid content concentration of the polyurethane resin is adjusted to be relatively low (for example, 20% by mass or less), and the concentration of the urethane group and the urea group in the polyurethane dispersion is lowered. However, the relatively low solid content concentration lowers the production efficiency of the coating film and the transportation cost.

Further, for example, it is also considered that the carbonate ion concentration is lowered by decarboxylation with nitrogen purging and the like and to improve the storage stability and the mechanical stability. However, there is a disadvantage that the decarboxylation cannot be sufficiently carried out with the simple nitrogen purging, and excellent storage stability and mechanical stability cannot be obtained.

Therefore, in this method, for example, the carbonate ion concentration in the polyurethane dispersion is lowered by vacuum purging.

More specifically, in this method, when the solid content concentration of the polyurethane dispersion is adjusted, an organic solvent and water are removed (desolvated) by vacuum purging. Also, by subsequent vacuum purging after completion of the desolvation, a carbon dioxide gas and carbonate ions in the polyurethane dispersion are removed (decarboxylated).

In other words, in this method, even after the organic solvent and water is removed (desolvated), the removal (decarboxylation) of the carbon dioxide gas and the carbonate ions is continued until the carbonate ion concentration of the polyurethane dispersion reaches a predetermined value or less.

As the conditions of the vacuum purging, the pressure conditions are, for example, 1 kPa or more, preferably 2 kPa or more, and for example, 50 kPa or less, preferably 40 kPa or less.

Further, the time of the vacuum purging is, for example, 0.5 hours or more, preferably 1.0 hour or more, more preferably 1.5 hours or more, further more preferably 2.0 hours or more, particularly preferably 3.0 hours or more.

Thus, the carbonate ion concentration in the polyurethane dispersion can be sufficiently lowered.

On the other hand, from the viewpoint of suppressing the aggregation, the longer the time of the vacuum purging and the lower the carbonate ion concentration, the more preferable. However, the lower the carbonate ion concentration and the longer the time of the vacuum purging, the lower the productivity and the higher the cost.

Therefore, from the viewpoint of productivity and cost, the time of the vacuum purging is, for example, 24.0 hours or less, preferably 18.0 hours or less, more preferably 12.0 hours or less, further more preferably 6.0 hours or less.

Thus, it is possible to obtain a polyurethane dispersion having sufficiently lowered carbonate ion concentration with excellent productivity and cost.

A residual solvent amount (solvent content) of the polyurethane dispersion is, for example, 0.5% by mass or less, preferably 0.3% by mass or less with respect to the total amount of the polyurethane dispersion.

The residual solvent amount of the polyurethane dispersion can be measured by a gas chromatography method in conformity with Examples to be described later.

Further, the carbonate ion concentration is 700 ppm or less, preferably 600 ppm or less, more preferably 500 ppm or less, further more preferably 400 ppm or less, particularly preferably 300 ppm or less, and usually 10 ppm or more with respect to the total amount of the polyurethane dispersion.

The carbonate ion concentration can be also measured by quantitative analysis (1 point calibration curve method) using an electrophoresis system in conformity with Examples to be described later.

In addition, in order to adjust the content ratio of the urethane group and the urea group with respect to the polyurethane dispersion, and the carbonate ion concentration within the above-described range, an organic solvent or water may be added if necessary.

Then, as described above, by sufficiently lowering the carbonate ion concentration, it is possible to suppress the elimination of the neutralizing agent by the carbonate ions, and to suppress the generation of the free anionic group and the aggregation of the polyurethane resin, so that the storage stability and the mechanical stability can be improved.

In addition, in the polyurethane dispersion, if necessary, various additives can be blended. Examples of the additive include a silane coupling agent, an alkoxysilane compound, a stabilizer (an antioxidant, a heat stabilizer, an ultraviolet absorber, and the like), a plasticizer, an antistatic agent, a lubricant, an anti-blocking agent, a surfactant, a dispersion stabilizer, a colorant (a pigment, a dye, and the like), a filler, a colloidal silica, inorganic particles, inorganic oxide particles, and a crystal nucleating agent.

The additive may be blended into each of the above-described raw material components in advance, may be blended into the isocyanate group-terminated prepolymer or the polyurethane resin after synthesis, or furthermore, may be blended simultaneously at the time of blending of each of the components.

Further, a mixing ratio of the additive is not particularly limited, and is appropriately set in accordance with the purpose and the application.

Further, if necessary, a thermoplastic resin having gas barrier properties may be also blended.

Examples of the thermoplastic resin having gas barrier properties include a polyvinyl alcohol, an ethylene-vinyl alcohol copolymer, a polyvinylidene chloride or a vinylidene chloride copolymer, and polysaccharides such as starch and cellulose.

A mixing ratio of the thermoplastic resin is not particularly limited, and is appropriately set in accordance with the purpose and the application.

Then, in such a polyurethane dispersion, the active hydrogen compound having an anionic group is used as a raw material component of the polyurethane resin, and a ratio of the total moles of the urethane group and the urea group is 1.5 mol or more with respect to 1 kg of the polyurethane dispersion, and the carbonate ion concentration is 700 ppm or less with respect to the polyurethane dispersion.

In other words, in the above-described polyurethane dispersion, the concentration of the urethane group and the urea group is relatively high. In such a case, when the elimination of the neutralizing agent with respect to the anionic group occurs and the free anionic group is generated, the stability of the particles tends to be lowered, and the aggregation of the polyurethane resin tends to occur.

However, in the above-described polyurethane dispersion, since the carbonate ion concentration is sufficiently low, the elimination of the neutralizing agent by the carbonate ion can be suppressed, and as a result, the generation of the free anionic group and the aggregation of the polyurethane resin can be suppressed.

Therefore, the above-described polyurethane dispersion has excellent storage stability.

For example, an average particle size D1 of the polyurethane dispersion before the storage (for example, immediately after the production) is, for example, 10 nm or more, preferably 20 nm or more, more preferably 30 nm or more, further more preferably 40 nm or more, and for example, 200 nm or less, preferably 100 nm or less, more preferably 60 nm or less.

On the other hand, an average particle size D2 of the polyurethane dispersion after the storage at 40° C. for 7 days is, for example, 10 nm or more, preferably 30 nm or more, more preferably 40 nm or more, and for example, 300 nm or less, preferably 200 nm or less, more preferably 150 nm or less, further more preferably 100 nm or less.

Then, as a reference of the storage stability, a change rate (D2/D1) of the average particle size D2 of the polyurethane dispersion after the storage at 40° C. for 7 days with respect to the average particle size D1 of the polyurethane dispersion before the storage is 2.5 or less, preferably 2.0 or less, more preferably 1.5 or less, further more preferably 1.2 or less, and usually 0.9 or more.

An average particle size of the polyurethane dispersion is measured in conformity with Examples to be described later.

Further, for example, viscosity V1 at 25° C. of the polyurethane dispersion before the storage (for example, immediately after the production) is, for example, 5 mPa·s or more, preferably 8 mPa·s or more, more preferably 10 mPa·s or more, and for example, 50 mPa·s or less, preferably 30 mPa·s or less, more preferably 20 mPa·s or less.

On the other hand, viscosity V2 at 25° C. of the polyurethane dispersion after the storage at 40° C. for 7 days is, for example, 5 mPa·s or more, preferably 8 mPa·s or more, more preferably 10 mPa·s or more, and for example, 50 mPa·s or less, preferably 30 mPa·s or less, more preferably 20 mPa·s or less.

Then, as a reference of the storage stability, a change rate (V2/V1) of the viscosity V2 of the polyurethane dispersion after the storage at 40° C. for 7 days with respect to the viscosity V1 of the polyurethane dispersion before the storage is 2.5 or less, preferably 2.0 or less, more preferably 1.5 or less, further more preferably 1.2 or less, and usually 0.9 or more.

The viscosity at 25° C. of the polyurethane dispersion is measured in conformity with Examples to be described later.

Further, the above-described polyurethane dispersion has excellent mechanical stability.

For example, an aggregation ratio of the polyurethane resin measured in conformity with Examples to be described later with a malonic-type tester is, for example, 6.0% or less, preferably 5.0% or less, more preferably 4.0% or less, further more preferably 3.0% or less, particularly preferably 2.0% or less, and usually 0.0% or more.

Thus, the above-described polyurethane dispersion has excellent storage stability and mechanical stability.

Therefore, the above-described polyurethane dispersion can be preferably used in the production of a polyurethane laminate including a polyurethane layer as a gas barrier layer.

In FIG. 1, a polyurethane laminate 1 includes a substrate 2, and a polyurethane layer 3 laminated on the substrate 2.

The substrate 2 is not particularly limited, and is, for example, formed of plastic (for example, a thermoplastic resin, a thermosetting resin, and the like), paper, cloth, wood, metal, and ceramics, and is preferably formed of plastic, more preferably formed of a thermoplastic resin.

Examples of the thermoplastic resin include polyolefin-based resins (for example, polyethylene, polypropylene, propylene-ethylene copolymer, and the like), polyester-based resins (for example, polyethylene terephthalate, polybutylene terephthalate, polyethylene naphthalate, and the like), polyamide-based resins (for example, Nylon 6 (registered trademark), Nylon 66 (registered trademark), polymethaxylylene adipamide, and the like), vinyl-based resins (for example, polyvinyl alcohol, ethylene-vinyl alcohol copolymer, polystyrene, polyvinyl acetate, and the like), acrylic-based resins (for example, polymethyl methacrylate, polyacrylonitrile, and the like), polycarbonate-based resins (for example, bisphenol A-type polycarbonate and the like), and cellulose-based resins (for example, cellophane, cellulose acetate, and the like). Preferably, a polyolefin-based resin, a polyester-based resin, and a polyamide-based resin are used. More preferably, a polypropylene, a polyethylene terephthalate, and Nylon 6 (registered trademark) are used.

The substrate 2 consists of a single layer, or a laminate of the same kind or two or more kinds.

A shape of the substrate 2 is not particularly limited, and examples thereof include a film-shape, a sheet-shape, a bottle-shape, and a cup-shape. Preferably, a film-shape is used.

The substrate 2 may be any of a non-stretched substrate, and a uniaxially or biaxially stretched substrate, and the substrate 2 may be subjected to a surface treatment (corona discharge treatment and the like), an anchor coat treatment, or an undercoat treatment, and furthermore, a vapor deposition treatment of metals such as aluminum and metal oxides such as silica, alumina, and a mixture of silica and alumina.

A thickness of the substrate 2 is, for example, 3 μm or more, preferably 5 μm or more, and for example, 500 μm or less, preferably 200 μm or less.

The polyurethane layer 3 is formed of the above-described polyurethane resin. From the viewpoint of production efficiency, the polyurethane layer 3 is preferably formed by applying the above-described polyurethane dispersion onto the substrate 2 to be dried.

More specifically, in order to form the polyurethane layer 3, a coating agent is prepared by adjusting the concentration of the polyurethane dispersion obtained by the above-described method. Then, the obtained coating agent is applied onto the substrate 2 to be dried.

In adjusting the concentration of the polyurethane dispersion, for example, a known method such as adding or removal of water or a known organic solvent and the like may be used.

The solid content concentration of the coating agent is, for example, 0.5% by mass or more, preferably 1% by mass or more, and for example, 30% by mass or less, preferably 25% by mass or less.

Further, if necessary, a curing agent may be also blended into the coating agent.

Examples of the curing agent include epoxy curing agents, melamine curing agents, carbodiimide curing agents, aziridine curing agents, oxazoline curing agents, and isocyanate curing agents. Among them, more specifically, examples of the isocyanate curing agent include water-dispersible isocyanate curing agents (for example, blocked isocyanate (for example, tolylene diisocyanate-based blocked isocyanate, hexamethylene diisocyanate-based blocked isocyanate, xylylene diisocyanate-based blocked isocyanate, hydrogenated xylylene diisocyanate-based blocked isocyanate, and the like), and non-blocked polyisocyanates having a hydrophilic group).

When the curing agent is blended, as a mixing ratio, a ratio of the curing agent as a solid content is, for example, 0.1 parts by mass or more, preferably 1 part by mass or more, and for example, 50 parts by mass or less, preferably 30 parts by mass or less with respect to 100 parts by mass of the polyurethane resin.

Further, a method for applying the coating agent is not particularly limited, and examples thereof include known coating methods such as a gravure coating method, a reverse coating method, a roll coating method, a bar coating method, a spray coating method, an air knife coating method, and a dipping method.

In addition, when the substrate 2 is produced, it may be applied by in-line.

Specifically, when the substrate 2 has a film shape, during the film formation, a coating agent is applied and dried by a gravure coating method and the like after a uniaxial stretched treatment in a longitudinal direction, and then, the substrate 2 is subjected to a biaxial stretched treatment, so that the polyurethane layer 3 can be provided on the substrate 2.

In addition, when the substrate 2 has a bottle shape, a coating agent is applied and dried by a dipping method and the like to a preform before blow molding, and then, the substrate 2 is subjected to blow molding, so that the polyurethane layer 3 can be provided on the substrate 2.

In addition, as the drying conditions, a drying temperature is, for example, 40° C. or more, preferably 50° C. or more, and for example, 250° C. or less, preferably 200° C. or less. Further, the drying time is, for example, 1 second or more, preferably 3 seconds or more, and for example, 10 minutes or less, preferably 5 minutes or less.

Thus, the polyurethane layer 3 composed of the polyurethane resin can be formed on the substrate 2, and thus, the polyurethane laminate 1 including the substrate 2 and the polyurethane layer 3 can be obtained.

A thickness of the polyurethane layer 3, as a lamination amount of the polyurethane resin (after drying), is, for example, 0.1 g/m² or more, preferably 0.2 g/m² or more, more preferably 0.3 g/m² or more, and for example, 10 g/m² or less, preferably 7 g/m² or less, more preferably 5 g/m² or less.

Further, a thickness of the polyurethane laminate 1 is, for example, 5 μm or more, v preferably 10 μm or more, and for example, 1 mm or less, preferably 0.5 mm or less.

Further, if necessary, the obtained polyurethane laminate 1 may be cured at, for example, 30 to 50° C. for about 2 to 5 days.

Since the polyurethane laminate 1 includes the polyurethane layer 3 obtained by using the above-described polyurethane dispersion, it has excellent gas barrier properties.

In addition, in the polyurethane laminate 1, a filler may be also dispersed in the polyurethane layer 3 in order to improve the gas barrier properties.

More specifically, for example, by applying a mixture of the above-described polyurethane dispersion and the filler to the substrate 2 to be dried, the polyurethane layer 3 in which the filler is dispersed can be formed.

Examples of the filler include organic nanofibers and layered inorganic compounds, and from the viewpoint of gas barrier properties, preferably, a layered inorganic compound is used.

Examples of the organic nanofiber include cellulose nanofibers and chitosan nanofibers.

Examples of the layered inorganic compound include a swellable layered inorganic compound and a non-swellable layered inorganic compound. From the viewpoint of gas barrier properties, preferably, a swellable layered inorganic compound is used.

The swellable layered inorganic compound is a clay mineral consisting of an ultrathin unit crystal and having properties in which a solvent coordinates or absorbs and swells between unit crystal layers.

Specifically, examples of the swellable layered inorganic compound include hydrous silicates (phyllosilicate minerals and the like), kaolinite-group clay minerals (halloysite, kaolinite, endellite, dickite, nacrite, and the like), antigorite-group clay minerals (antigorite, chrysotile, and the like), smectite-group clay minerals (montmorillonite, beidellite, nontronite, saponite, hectorite, sauconite, stevensite, and the like), vermiculite-group clay minerals (vermiculite and the like), mica or mica-group clay minerals (mica such as platinum mica and gold mica, margarite, tetrasilicic mica, teniolite, and the like), and synthetic mica.

These swellable layered inorganic compounds may be natural clay minerals or may be synthetic clay minerals. Further, these may be used alone or in combination of two or more, and preferably, a smectite-group clay mineral (montmorillonite and the like), a mica-group clay mineral (water-swellable mica and the like), and a synthetic mica are used, more preferably, a synthetic mica is used.

An average particle size of the filler is, for example, 50 nm or more, preferably 100 nm or more, and usually 10 μm or less, for example, 5 μm or less, preferably 3 μm or less. Further, an aspect ratio of the filler is, for example, 50 or more, preferably 100 or more, more preferably 200 or more, and for example, 5000 or less, preferably 3000 or less, more preferably 2000 or less.

When the aspect ratio of the filler is within the above-described range, a permeation pathway is relatively prolonged because the permeation pathway of the gas becomes zigzag between crystal layers of the filler (gap between the silicate layers), and the permeation of the gas can be suppressed, so that the gas barrier properties can be improved.

Then, in order to form the polyurethane layer 3 in which the filler is dispersed, for example, first, the above-described polyurethane dispersion and the filler are mixed, and a hybrid coating agent is prepared as a mixture. Then, the obtained hybrid coating agent is applied onto the substrate 2 to be dried.

To prepare the mixture (hybrid coating agent), first, the filler is dispersed in water, and then, a polyurethane dispersion (including a polyurethane resin) is added to the dispersion liquid.

As a mixing ratio of the polyurethane resin to the filler, a ratio of the filler is 0.1 parts by mass or more, preferably 1 part by mass or more, and for example, 50 parts by mass or less, preferably 30 parts by mass or less with respect to 100 parts by mass of the total amount of the mass of the polyurethane resin and the filler.

When the mixing ratio of the polyurethane resin to the filler is within the above-described range, it is possible to maintain the gas barrier properties, and to improve the adhesive properties to the substrate, the transparency, and the low cost.

In the obtained mixture (hybrid coating agent), the total concentration of the polyurethane resin and the filler is, for example, 0.1% by mass or more, preferably 0.5% by mass or more, and for example, 15% by mass or less, preferably 12% by mass or less.

In the mixture (hybrid coating agent), since there is a possibility that the filler may be subjected to secondary aggregation, preferably, after dispersing or mixing the filler in a solvent, the filler is, for example, dispersed by using a mechanical forced dispersion treatment in which a shearing force acts such as a dispersion process by a homomixer, a colloidal mill, a jet mill, a kneader, a bead mill, a sand mill, a ball mill, three rolls, and an ultrasonic dispersion device.

Further, an application method of the hybrid coating agent is not particularly limited, and the above-described known coating method is used.

As the drying conditions, a drying temperature is, for example, 40° C. or more, preferably 50° C. or more, and for example, 250° C. or less, preferably 200° C. or less. Further, the drying time is, for example, 1 second or more, preferably 3 seconds or more, and for example, 10 minutes or less, preferably 5 minutes or less.

Thus, the polyurethane layer 3 (composite polyurethane layer) composed of the polyurethane resin and the filler can be formed on the substrate 2, and thus, the polyurethane laminate 1 can be obtained.

A thickness of the polyurethane layer 3, as a lamination amount of the polyurethane resin and the filler (after drying), is, for example, 0.1 $g/m^2$ or more, preferably 0.2 $g/m^2$ or more, more preferably 0.3 $g/m^2$ or more, and for example, 10 $g/m^2$ or less, preferably 7 $g/m^2$ or less, more preferably 5 $g/m^2$ or less.

Further, a thickness of the polyurethane laminate 1 is, for example, 5 µm or more, preferably 10 µm or more, and for example, 1 mm or less, preferably 0.5 mm or less.

In addition, in the polyurethane laminate 1, as a mass ratio of the filler, the mass of the filler is, for example, 0.1 parts by mass or more, preferably 0.2 parts by mass or more, more preferably 1 part by mass or more, and for example, 90 parts by mass or less, preferably 70 parts by mass or less, more preferably 50 parts by mass or less with respect to 100 parts by mass of the total amount of the polyurethane layer 3.

When the mass ratio of the filler is within the above-described range, since the improvement in the adhesive properties to the substrate, and the transparency can be achieved, and the mixing ratio of the filler can be lowered, the low cost properties can be improved.

Further, if necessary, the obtained polyurethane laminate 1 may be, for example, cured at 30 to 60° C. for about 2 to 5 days.

The polyurethane laminate 1 includes the polyurethane layer 3 obtained by using the above-described polyurethane dispersion, and the filler is also dispersed in the polyurethane layer 3, so that the polyurethane laminate 1 has particularly excellent gas barrier properties.

Therefore, the polyurethane laminate 1 is preferably used in the field of a film having gas barrier properties, specifically, a packaging film for food and medicine, a food packaging container (including a bottle), an optical film, an industrial film, and the like, and is particularly preferably used as a food packaging film for the content requiring a heat treatment such as a high-temperature sterilization treatment such as boil sterilization or retort sterilization, and heat cooking.

In addition, a colorant such as a pigment is included in the above-described coating agent to be prepared as an ink for printing, and it is applied onto a plastic film, paper, various containers, and the like to be preferably used as a printing film or a printing body.

Figure 2:
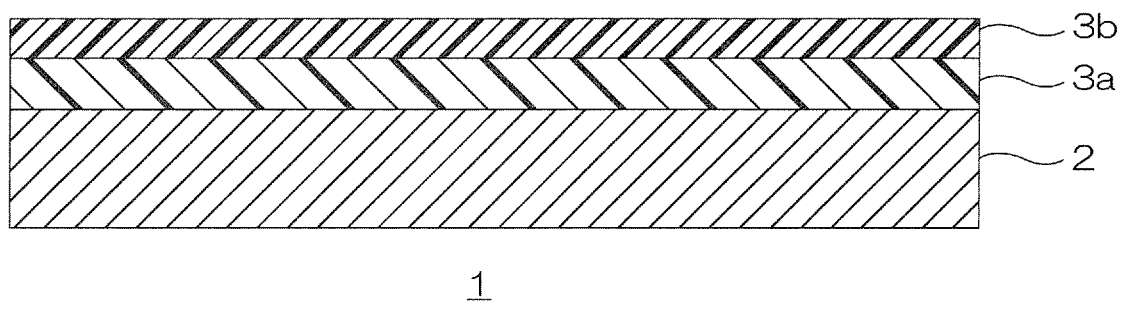
FIG. 2 shows a schematic configuration view for illustrating another embodiment of a polyurethane laminate obtained by using a polyurethane dispersion of the present invention.

In the above-described description, the polyurethane layer 3 has a single layer. Alternatively, as shown in FIG. 2, for example, the polyurethane layer 3 may have two layers of a first polyurethane layer 3a laminated on the substrate 2 and a second polyurethane layer 3b laminated on the first polyurethane layer 3a, and furthermore, though not shown, the polyurethane layer 3 may have multilayers of three or more layers.

In addition, in the polyurethane laminate 1, when a filler is dispersed in the polyurethane layer 3, a filler may be dispersed in at least any one of the layers, or may be dispersed in all of the layers. Also, a filler may not be dispersed in any of the layers.

For example, the polyurethane layer 3 may have the two layers of the first polyurethane layer 3a laminated on the substrate 2 and the second polyurethane layer 3b laminated on the first polyurethane layer 3a, and a filler can be dispersed only in the second polyurethane layer 3b.

In addition, in the above-described description, the polyurethane layer 3 is laminated on the entire one surface in a thickness direction of the substrate 2. However, the lamination is not limited to this, and, though not shown, for example, the polyurethane layer 3 may be laminated on both surfaces in the thickness direction of the substrate 2 and furthermore, the substrate 2 may be partially laminated on the polyurethane layer 3.

EXAMPLES

Next, the present invention is described based on Examples and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

A measurement method used in the following is described below.

<Carbonate Ion Concentration>

The carbonate ion concentration in the polyurethane dispersion was quantified by an electrophoresis system.

In other words, a sample of the polyurethane dispersion was fractionately weighed, and then, appropriately diluted and dissolved with ultrapure water to prepare a quantitative sample solution. Then, the quantitative sample solution and a standard solution were measured by the following electrophoresis system. In addition, a sample measurement solution to which the standard solution having known concentration was added was prepared, and an addition collection test was carried out.

(Device and Measurement Conditions)

Device: manufactured by Agilent Technologies, Inc., 7100 capillary electrophoresis system Buffer: manufactured by Agilent Technologies, Inc., toxic anion analytical buffer Then, the carbonate ion concentration was determined by a one-point calibration curve quantitation method, and a mass ratio of these was calculated.

<Residual Solvent>

A residual solvent amount in the polyurethane dispersion was quantified by a gas chromatography method.

That is, 1-propanol was used as an internal reference, and a reference material, a polyurethane dispersion, and each of the quantitative sample aqueous solutions were prepared. Then, measurement was carried out under the following gas chromatography conditions, and a residual solvent amount in the polyurethane dispersion was calculated.

(Device and Measurement Conditions)

Device: manufactured by Shimadzu Corporation, GC-2014

Column: Sunpak-A 50/80, glass column φ3.2 mm×2 mm×2.1 m

Detector: FID

Synthesis Example 1 (PUD1)

A reaction liquid containing an isocyanate group-terminated prepolymer was obtained by mixing 170.7 g of TAKENATE 500 (1,3-xylylene diisocyanate, m-XDI, manufactured by Mitsui Chemicals, Inc.), 29.8 g of Vestanat $H_{12}$MDI (4,4'-methylenebis(cyclohexyl isocyanate), $H_{12}$MDI, manufactured by EVONIK JAPAN CO., LTD.), 34.4 g of ethylene glycol, 2.6 g of trimethylolpropane, 19.6 g of dimethylolpropionic acid, and 146.2 g of methyl ethyl ketone as a solvent to be reacted at 65 to 70° C. under a nitrogen atmosphere until the isocyanate group concentration (NCO % per solid content excluding the solvent) reached 9.53% by mass.

The urethane group concentration (charging ratio) of the isocyanate group-terminated prepolymer was 33.5% by mass.

Next, a reaction liquid was cooled to 40° C., and subsequently, neutralized with 14.5 g of triethylamine.

Next, the reaction liquid was dispersed in 1009.7 g of ion-exchanged water with a homodisper, and an amine aqueous solution in which 28.5 g of 2-((2-aminoethyl)amino)ethanol was dissolved in 85.6 g of ion-exchanged water was added to the dispersion liquid. Thereafter, a chain extension reaction was carried out for two hours to obtain a polyurethane resin.

Thus, a polyurethane dispersion 1 (PUD1) was obtained.

When a content ratio of the urethane group and the urea group with respect to 1 kg of the polyurethane resin (solid content) was calculated from the charging ratio, it was 6.7 mol (39.6% by mass on the basis of mass).

Further, when the acid value of the solid content of the polyurethane resin was measured in conformity with JIS K 1557-5 (2007), it was 27.3 mgKOH/g.

Synthesis Examples 2 to 8 (PUD2 to 8)

Polyurethane dispersions 2 to 8 (PUD2 to 8) were obtained in the same manner as in Synthesis Example 1 in accordance with the formulation shown in Table 1.

Examples 1 to 13 and Comparative Examples 1 to 4 The polyurethane dispersion (PUD) shown in Table 2 was vacuum-purged for the time shown in Table 2 with an evaporator under a reduced pressure of a water bath temperature of 50° C. Thus, it was confirmed that a ratio of a methyl ethyl ketone as a solvent was 0.3% by mass or less.

The solvent (methyl ethyl ketone) was quantified by a gas chromatography method. 0.3% by mass is the detection limit in the quantification method.

Further, Comparative Example 1 shows that when the vacuum purging is carried out for one hour, the solvent concentration is 0.3% by mass or less, and the removal of the solvent is completed.

Thereafter, the concentration was adjusted with the ion-exchanged water so as to have the solid content concentration shown in Table 2.

<<Evaluation>>

<Evaluation of Polyurethane Dispersion>

(1) Storage Stability 1 (Average Particle Size)

The particle size D1 of PUD was measured by using a concentrated system particle size analyzer FPAR-1000 (manufactured by OTSUKA ELECTRONICS CO., LTD.).

Further, after PUD was stored at 40° C. for 7 days, the particle size D2 was measured in the same manner.

Then, a change rate of the particle size (D2/D1) before and after the storage was calculated.

The results are shown in Table 2.

(2) Storage Stability 2 (Viscosity)

The viscosity V1 at 25° C. of PUD was measured in conformity with JIS K 7117 (1999).

Further, after PUD was stored at 40° C. for 7 days, the viscosity V2 at 25° C. was measured in the same manner.

Then, a change rate of the particle size (V2/V1) before and after the storage was calculated.

The results are shown in Table 2.

(3) Mechanical Stability

PUD (100 g) was treated with a malonic-type testing machine (malonic-type mechanical stability testing machine AB-802, manufactured by TESTER SANGYO CO., LTD.) at a load of 15 kg and a rotation of 1,000 rpm for 15 minutes.

Thereafter, the treatment liquid was filtered with a 100-mesh wire net, the residue was washed with water, and then, dried at 110° C. for two hours to collect an aggregate. Then, the mass of the obtained aggregate was measured, and the aggregate concentration (% by mass) was calculated.

Then, a ratio of the aggregate concentration (%) with respect to the solid content concentration (%) of PUD was determined, and an aggregation ratio of the polyurethane resin was determined by the following formula. This was used as a reference of evaluation. The results are shown in Table 2.

(aggregation ratio (%) of polyurethane resin)=[(aggregate concentration)/(solid content concentration)]×100

The smaller the value, the higher the mechanical stability.

<Evaluation of Laminate>

(4) Oxygen Permeation

PUD was applied to a polyethylene terephthalate film (biaxially stretched polyester film, trade name: TOYOBO ESTER film E5102, manufactured by TOYOBO CO., LTD., thickness of 12 m) as a substrate by using a bar coater so as to have a thickness of 3 g/m$^2$ at the time of drying.

Next, the coating film was placed in a drying oven set at 110° C. for one minute to be dried, thereby obtaining a laminate.

An oxygen permeation (cc) per m$^2$, day, and atmospheric pressure at 80% of relative humidity (80% RH) at 20° C. of the laminate was measured immediately after the production of the laminate, and at 40° C. after 7 days by using an oxygen permeation measuring device (OX-TRAN2/20, manufactured by AMETEK MOCON) in conformity with JIS K 7126-2 (2006). The results are shown in Table 1.

Since the polyurethane dispersion of Comparative Example 1 had relatively high carbonate ion concentration (above 700 ppm), the aggregation tended to occur, and the storage stability and the mechanical stability were not sufficient.

Further, since the polyurethane dispersion of Comparative Example 2 had relatively low solid content concentration (20% by mass or less), the production efficiency of the coating film and the reduction of the transportation cost were lowered.

In addition, the polyurethane dispersion of Comparative Example 3 and Comparative Example 4 had insufficient gas barrier properties of the polyurethane resin.

TABLE 1

| | | | Synthesis Ex. 1 PUD1 | Synthesis Ex. 2 PUD2 | Synthesis Ex. 3 PUD3 | Synthesis Ex. 4 PUD4 | Synthesis Ex. 5 PUD5 | Synthesis Ex. 6 PUD6 | Synthesis Ex. 7 PUD7 | Synthesis Ex. 8 PUD8 |
|---|---|---|---|---|---|---|---|---|---|---|
| Mixing Formulation (parts by mass) | Polyisocyanate Component | XDI | 170.7 | 88.0 | — | 147.2 | 134.6 | 85.3 | 101.3 | 196.0 |
| | | H6XDI | — | — | 198.9 | — | — | — | — | — |
| | | TDI | — | — | — | — | — | — | 93.7 | — |
| | | H12MDI | 29.8 | 30.7 | — | 25.6 | 23.5 | 14.9 | — | — |
| | | HDI | — | 78.7 | — | — | — | — | — | — |
| | Polyol Component | Ethylene Glycol | 34.4 | 35.5 | 27.6 | — | 14.3 | — | 36.3 | 25.9 |
| | | Trimethylolpropane | 2.6 | 2.7 | — | 1.9 | 2.6 | — | 2.7 | 3.1 |
| | | Triethylene Glycol | — | — | — | 61.7 | — | 20.3 | — | — |
| | | P400 | — | — | — | — | 69.0 | — | — | — |
| | | UH-200 | — | — | — | — | — | 134.9 | — | — |
| | | Dimethylol Propionic Acid | 19.6 | 20.2 | 16.6 | 19.6 | 19.3 | 21.7 | 20.6 | 17.1 |
| | Solvent | Methyl Ethyl Ketone | 146.2 | 145.7 | — | 145.7 | 149.4 | — | 145.3 | 109.1 |
| | | Acetonitrile | — | — | 72.0 | — | — | 125.6 | — | — |
| | Neutralizing Agent | Triethyl Amine | 14.5 | 14.9 | 12.3 | 14.5 | 14.3 | 16.1 | 15.2 | 12.6 |
| | For Water-Dispersion | Water | 1009.7 | 1007.0 | 961.7 | 1007.0 | 1027.8 | 1074.6 | 1005.0 | 1328.7 |
| | Amine Extender | 2-((2-aminoethyl)amino)ethanol | 28.5 | 29.4 | 44.6 | 29.5 | 22.5 | — | 30.1 | 45.3 |
| | | Hydrazine Hydrate | — | — | — | — | — | 6.9 | — | — |
| | For Dilution | Water | 85.6 | 88.3 | 133.7 | 88.4 | 67.6 | 20.8 | 90.3 | 136.0 |
| Solid Content Concentration (% by mass) | | | 30.0 | 30.0 | 25.0 | 30.0 | 30.0 | 30.0 | 30.0 | 30.0 |
| NCO % of Isocyanate Group-Terminated Prepolymer (per solid content) | | | 9.53 | 9.88 | 15.73 | 9.88 | 7.34 | 4.42 | 10.15 | 16.07 |
| Concentration of Urethane Group and Urea Group of Polyurethane Resin (mol/kg, per solid content) | | | 6.7 | 7.0 | 6.7 | 5.8 | 5.3 | 3.4 | 7.1 | 6.9 |
| Acid Value of Polyurethane Resin (mgKOH/g) | | | 27.3 | 28.1 | 23.2 | 27.3 | 26.9 | 30.3 | 28.8 | 23.8 |

TABLE 2

| No. | PUD | Vacuum Purging Time (h) | Solid Content Concentration % by mass | Urethane Group/Urea Group (mol/kg) To Solid Content | Urethane Group/Urea Group (mol/kg) To PUD | Carbonate Ion in PUD ppm | Residual Solvent % by mass | Particle Size nm Initial Stage | Particle Size nm 40° C. after 7 days | Change Rate |
|---|---|---|---|---|---|---|---|---|---|---|
| Ex. 1 | PUD1 | 6.0 | 30 | 6.7 | 2.0 | 100 | 0.3% or less | 52 | 59 | 1.1 |
| Ex. 2 | PUD1 | 5.0 | 30 | 6.7 | 2.0 | 200 | 0.3% or less | 52 | 57 | 1.1 |
| Ex. 3 | PUD1 | 4.0 | 30 | 6.7 | 2.0 | 280 | 0.3% or less | 52 | 72 | 1.4 |
| Ex. 4 | PUD1 | 3.0 | 30 | 6.7 | 2.0 | 320 | 0.3% or less | 52 | 84 | 1.6 |
| Ex. 5 | PUD1 | 2.0 | 30 | 6.7 | 2.0 | 520 | 0.3% or less | 52 | 119 | 2.3 |
| Ex. 6 | PUD1 | 1.5 | 30 | 6.7 | 2.0 | 650 | 0.3% or less | 52 | 129 | 2.5 |
| Comparative Ex. 1 | PUD1 | 1.0 | 30 | 6.7 | 2.0 | 800 | 0.3% or less | 52 | 151 | 2.9 |
| Ex. 7 | PUD1 | 1.0 | 25 | 6.7 | 1.7 | 667 | 0.3% or less | 52 | 75 | 1.4 |
| Comparative Ex. 2 | PUD1 | 1.0 | 20 | 6.7 | 1.3 | 533 | 0.3% or less | 52 | 60 | 1.2 |
| Ex. 8 | PUD2 | 5.0 | 30 | 7.0 | 2.1 | 300 | 0.3% or less | 41 | 78 | 1.9 |
| Ex. 9 | PUD3 | 5.0 | 25 | 6.8 | 1.7 | 280 | 0.3% or less | 51 | 70 | 1.4 |
| Ex. 10 | PUD4 | 4.0 | 30 | 5.8 | 1.7 | 330 | 0.3% or less | 55 | 77 | 1.4 |
| Ex. 11 | PUD5 | 4.0 | 30 | 5.2 | 1.6 | 300 | 0.3% or less | 53 | 64 | 1.2 |
| Ex. 12 | PUD7 | 5.0 | 30 | 7.1 | 2.1 | 200 | 0.3% or less | 54 | 67 | 1.2 |
| Ex. 13 | PUD8 | 5.0 | 30 | 6.9 | 2.1 | 220 | 0.3% or less | 87 | 118 | 1.4 |
| Comparative Ex. 3 | PUD6 | 1.0 | 30 | 3.4 | 1.0 | 800 | 0.3% or less | 71 | 76 | 1.1 |
| Comparative Ex. 4 | PUD6 | 3.0 | 30 | 3.4 | 1.0 | 300 | 0.3% or less | 71 | 76 | 1.1 |

TABLE 2-continued

| No. | Viscosity mPa·s | | | Oxygen Permeation cc/(m²·day·atm) | | Mechanical Stability (%) |
|---|---|---|---|---|---|---|
| | Initial Stage | 40° C. after 7 days | Change Rate | Initial Stage | 40° C. after 7 days | |
| Ex. 1 | 11 | 11 | 1.0 | 30 | 30 | 0.1 |
| Ex. 2 | 11 | 11 | 1.0 | 30 | 30 | 1.7 |
| Ex. 3 | 11 | 10 | 0.9 | 30 | 30 | 2.1 |
| Ex. 4 | 11 | 11 | 1.0 | 30 | 31 | 2.8 |
| Ex. 5 | 11 | 16 | 1.5 | 30 | 33 | 3.7 |
| Ex. 6 | 11 | 46 | 4.2 | 30 | 39 | 5.0 |
| Comparative Ex. 1 | 11 | 120 | 10.9 | 30 | — | 6.1 |
| Ex. 7 | 11 | 11 | 1.0 | 30 | 30 | 4.1 |
| Comparative Ex. 2 | 11 | 11 | 1.0 | 30 | 30 | 2.3 |
| Ex. 8 | 13 | 14 | 1.1 | 64 | 64 | 2.0 |
| Ex. 9 | 10 | 11 | 1.1 | 45 | 46 | 0.8 |
| Ex. 10 | 11 | 10 | 0.9 | 74 | 74 | 0.6 |
| Ex. 11 | 11 | 11 | 1.0 | 86 | 86 | 0.5 |
| Ex. 12 | 12 | 11 | 0.9 | 38 | 39 | 1.6 |
| Ex. 13 | 13 | 12 | 0.9 | 40 | 45 | 3.4 |
| Comparative Ex. 3 | 12 | 11 | 0.9 | 99 | 99 | <0.1 |
| Comparative Ex. 4 | 12 | 11 | 0.9 | 99 | 99 | <0.1 |

The details of abbreviations in Table are described below.

XDI: trade name: TAKENATE 500, 1,3-xylylene diisocyanate, m-XDI, manufactured by Mitsui Chemicals, Inc.

H6XDI: trade name: TAKENATE 600, 1,3-bis(isocyanatomethyl)cyclohexane, manufactured by Mitsui Chemicals, Inc.

TDI: trade name: TAKENATE 80, tolylene diisocyanate, 2,4-isomer/2,6-isomer=80/20 (mass ratio), manufactured by Mitsui Chemicals, Inc.

H12MDI: trade name: Vestanat $H_{12}$MDI, 4,4'-methylenebis(cyclohexyl isocyanate), manufactured by EVONIK JAPAN CO., LTD.

UH-200: trade name: ETERNACOLL R UH-200, polycarbonate diol, number average molecular weight of 2000, manufactured by UBE INDUSTRIES, LTD.

P400: trade name: ACTCOL P400, polyoxypropylene glycol, number average molecular weight of 400, manufactured by Mitsui Chemicals. Inc.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The polyurethane dispersion of the present invention is preferably used in a packaging film for food and medicine, a food packaging container, an optical film, an industrial film, and the like.

DESCRIPTION OF REFERENCE NUMERALS

1 Polyurethane laminate
2 Substrate
3 Polyurethane layer

The invention claimed is:

1. A polyurethane dispersion obtained by water-dispersing a polyurethane resin, wherein
    the polyurethane resin is a reaction product of an isocyanate group-terminated prepolymer that is water-dispersed and a chain extender,
    the isocyanate group-terminated prepolymer is obtained by reacting at least a polyisocyanate component with an active hydrogen group-containing component containing an active hydrogen compound having an anionic group,
    a ratio of the total moles of a urethane group and a urea group is 1.5 mol or more with respect to 1 kg of the polyurethane dispersion, and
    the carbonate ion concentration is 10 ppm or more and 700 ppm or less with respect to the polyurethane dispersion.

2. The polyurethane dispersion according to claim 1, wherein
    the polyurethane resin is a polyurethane resin having gas barrier properties.

3. The polyurethane dispersion according to claim 1, wherein
    the polyisocyanate component contains a polyisocyanate having an aromatic ring.

4. The polyurethane dispersion according to claim 1, wherein
    the polyisocyanate component contains an araliphatic polyisocyanate and an alicyclic polyisocyanate.

5. The polyurethane dispersion according to claim 1, wherein
    the isocyanate group-terminated prepolymer is obtained by reacting at least the polyisocyanate component containing a xylylene diisocyanate with the active hydrogen group-containing component containing a short chain diol having 2 to 6 carbon atoms and the active hydrogen compound having the anionic group.

6. The polyurethane dispersion according to claim 1, wherein a change rate (D2/D1) of an average particle size D2 of the polyurethane dispersion after storage at 40° C. for 7 days with respect to an average particle size D1 of the polyurethane dispersion before storage is 2.5 or less.

* * * * *